UNITED STATES PATENT OFFICE.

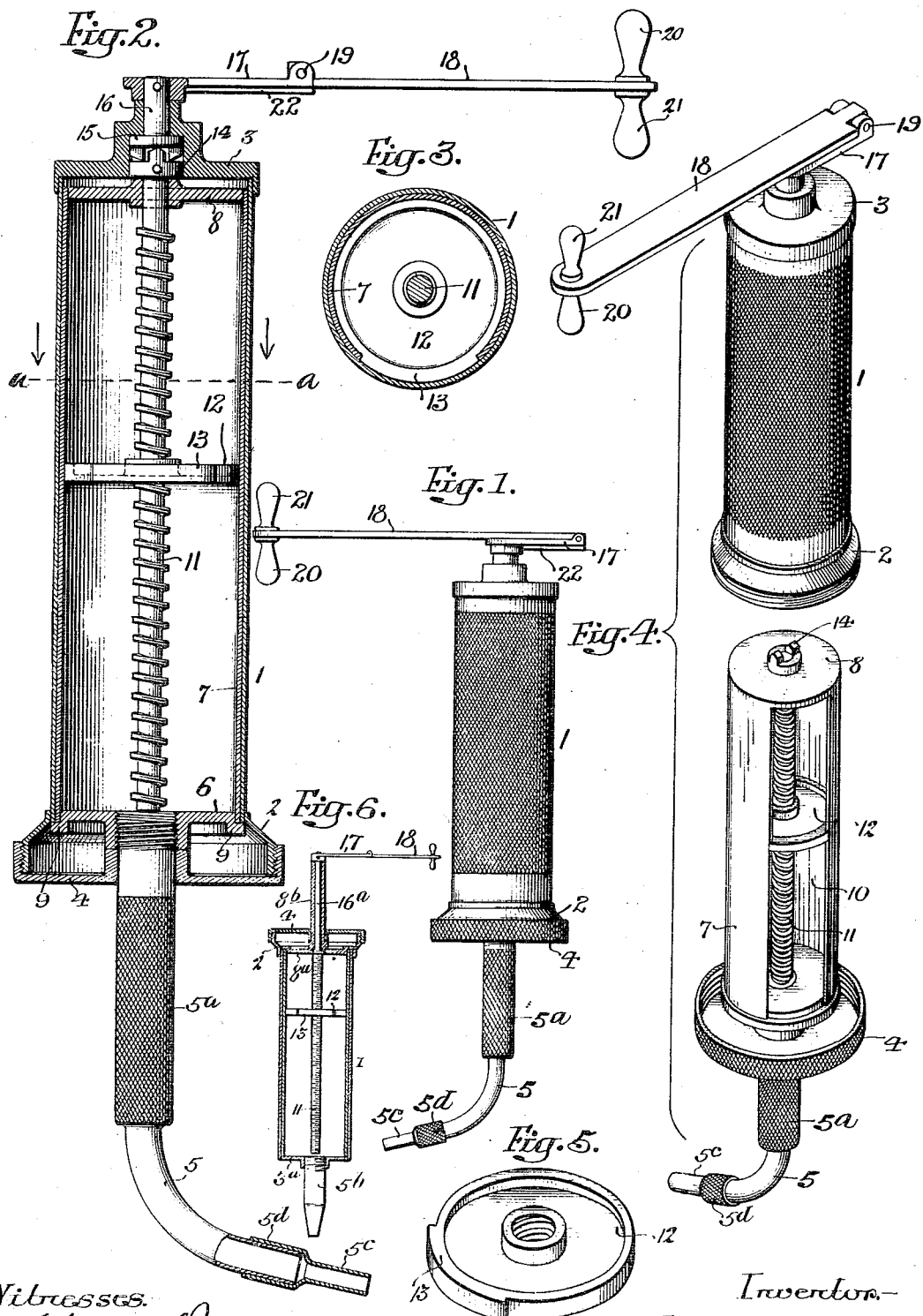

SAMUEL P. TOWNSEND, OF ORANGE, NEW JERSEY.

GREASE-GUN.

983,095.

Specification of Letters Patent.

Patented Jan. 31, 1911.

Application filed January 25, 1910. Serial No. 539,922.

*To all whom it may concern:*

Be it known that I, SAMUEL P. TOWNSEND, a citizen of the United States, and a resident of Orange, New Jersey, have invented certain Improvements in Grease-Guns, of which the following is a specification.

One object of my invention is to provide a grease gun, of the class described and claimed in my application for Patent No. 438,154, filed June 12, 1908, which shall be so constructed that the solid lubricant adhering to or projecting from the outside surface of its inner member after it has been filled, shall be directed into and retained within its outer member when said two members are put together prior to their use.

I further desire to so construct the various parts of the grease gun that they may be easily grasped and held from turning even though they may be more or less greasy; it being also desired that each of the two members of the device shall be so made as to include a hand hold or gripping portion.

Another object of the invention is to provide a device of the character described with a novel arrangement of parts for actuating the piston and for mounting the various parts so as to permit of their convenient and rapid manipulation under conditions of use.

These objects and other advantageous ends I secure as hereinafter set forth reference being had to the accompanying drawings, in which;—

Figure 1, is a side elevation of the grease gun forming the subject of the present invention; Fig. 2, is a vertical section; Fig. 3, is a transverse section on the line *a—a* Fig. 2; Fig. 4, is a detached perspective view showing the detail construction of the two parts of the grease gun; Fig. 5, is a perspective view of the piston, and Fig. 6, is a vertical section of a slightly modified form of grease gun.

In the above drawings, 1 represents the outer cylinder which has a funnel shaped end 2 and at its other extremity is permanently closed by a fixed head 3. The end 2 is threaded for the reception of a removable cover 4, which, in that form of the invention shown in Figs. 1 to 5 inclusive, has a central opening through which loosely passes the nozzle or outlet spout 5. This latter may obviously have any of a number of forms and has a part of its surface milled, as indicated at 5ª, so as to provide a convenient grip whereby it may be held from turning. The inner end of this nozzle is screwed or otherwise attached to the head 6 of the inner cylinder 7, which closely fits within the outer cylinder and extends so that its head 8 is immediately adjacent to the head 3 of said outer cylinder. The head 6 of this inner cylinder is preferably flanged, as indicated at 9, so that it can engage the edge of the cylinder 1 where it projects within the funnel shaped end 2 thereof. As shown best in Fig. 4, the inner cylinder has in its side an elongated opening 10 extending for practically its entire length, in order to permit of the convenient introduction of the lubricant, and it also has mounted axially within it a screw 11, which in this case is partly carried in a bearing in the center of the head 8 of this inner cylinder.

Threaded on the screw 11 is a piston 12 which, as shown in Figs. 4 and 5, tightly fits the interior of the cylinder 7, and in addition has a radially projecting, segmental flange 13, which extends through the opening 10 in the side of the inner cylinder and practically engages with the inner surface of the outer cylinder, so that when the inner cylinder is placed within the cylinder 1, the lubricant cannot escape past said piston when this latter is moved in said inner cylinder.

The end of the screw 11 projects through the head 8 of the cylinder 7, where it has fixed to it one member 14 of a clutch or coupling whose second member 15 is carried by a short spindle 16 mounted in the head 3 of the outer cylinder 1; the arrangement being such that when the inner cylinder is placed within the outer cylinder, and the cover 4 is screwed upon the funnel shaped end 2 thereof, these two ends of the coupling engage each other and operatively connect the spindle 16 with the screw 11.

The operating handle is made in two parts 17 and 18 and has the first of these parts pinned or otherwise fixed to the spindle 16, while the second part, which is connected to the first part of the handle by a pivot pin 19, is provided with two knobs 20 and 21 projecting from opposite faces of said part. A spring 22, mounted on the part 17 of the handle, acts on the adjacent end of the part 18 so as to tend to hold said part either in the extended position shown in Fig. 2, or in the folded position shown in Fig. 1.

Under operating conditions, the inner cylinder is held by means of the milled portion 5ª of the nozzle, and by means of a suitable tool, such as a paddle, the solid lubricant is introduced through the opening 10; it being understood that the piston 12 has previously been moved to a position adjacent to the head 8. After being filled, the inner cylinder is inserted within the outer cylinder, and any lubricant which may be adhering to its sides is collected in the funnel shaped end 2 of the outer cylinder. Finally, when said cylinders have been brought into the positions shown in Fig. 2, the two clutch members 14 and 15 are connected with each other, and the flange 9 of the head 6 of the inner cylinder seats itself upon the end of the outer cylinder 1. The cover 4 may then be screwed onto the threaded portion of this funnel shaped end, after which the lubricant may be applied to any desired part of a machine by such a revolution of the handle as will cause the piston 12 to be moved longitudinally of the cylinders toward the outlet nozzle 5. When the handle is in its extended position, a relatively great leverage is obtained for forcing of the piston through the cylinders and the expulsion of the solid lubricant through the nozzle, while when the handle is folded it may be rapidly turned with great convenience to bring back the piston to a position adjacent to the head 8, after which the cylinder is ready for filling.

If desired, the removable cover of the outer cylinder may be applied at the end thereof having the handle, as in Fig. 6, instead of at the end having the nozzle, as in the other figures, and for this purpose, the nozzle 5ᵇ is preferably mounted in and carried by one head 3ª of the outer cylinder, while the inner cylinder is open at its adjacent end.

As before, the outer cylinder 1 is provided with a funnel shaped end 2 and a cover 4 capable of fitting thereon, but in this case the screw 11 is fixed to an elongated spindle 16ª projecting through a tubular extension 8ᵇ of the inner cylinder. This tubular extension is of such length as to permit of its being conveniently grasped by the hand between the handles 17 and 18 and the cover 4, so that said cover with the inner cylinder may be conveniently held while the latter is being filled. It is obvious that in this form of the invention it is not necessary to provide the couplings 14 and 15, since the screw is carried by the cover 8ª attached to the inner cylinder and is also permanently connected to the spindle 16ª.

If desired, a reducing nozzle or cap 5ᶜ may be employed upon the end of the nozzle 5, and in such case it is advisable to provide said reducing nozzle with a milled portion 5ᵈ so that it also may be tightly held from turning even though it be greasy. The end of the main nozzle 5, for the reception of this auxiliary nozzle is preferably provided with a slight taper onto which the latter nozzle fits so as to be held in place by friction.

I claim:—

1. The combination in a grease gun of two cylinders of which one fits within the other; a nozzle connected to one of the cylinders; means within the inner cylinder for forcing material therein out through said nozzle; and a handle for actuating said means; one of the ends of the outer cylinder being funnel shaped; with a removable cover connected to the inner cylinder and fitting said end.

2. The combination in a grease gun, of two cylinders, one fitting within the other; a piston in the inner cylinder; an outlet nozzle connected to one of the cylinders; means for actuating the piston to force the material from the inner cylinder out through said nozzle, and a removable cover for the outer cylinder; said parts including a gripping portion, other than the cover and the outer cylinder, connected to the inner cylinder and projecting outside of the gun.

3. The combination in a grease gun of two cylinders of which one fits inside of the other; the outer cylinder having a funnel shaped end and being provided with a removable cover; a flanged head for the inner cylinder capable of fitting into the funnel shaped end of the outer cylinder; said outer cylinder having a shouldered portion at its funnel shaped end in position to co-act with the flanged head of the inner cylinder; a nozzle for the grease gun; and means for forcing material from the inner cylinder out through the nozzle.

4. The combination in a grease gun of two cylinders one fitting within the other; a nozzle connected to one of the cylinders; a removable cover for the outer cylinder; a piston in the inner cylinder; an operating screw for said piston; with an operating handle carried by the outer cylinder; and a coupling within the grease gun detachably connecting the handle to said screw.

5. The combination in a grease gun of two cylinders, one fitting within the other; a piston in the inner cylinder; means for moving said piston; an outlet nozzle connected to the inner cylinder; and a cover for the outer cylinder loosely mounted on said nozzle.

6. The combination in a grease gun of two cylinders, one fitting within the other; a piston within the inner cylinder; means for actuating said piston; a cover for the outer cylinder; and an outlet nozzle rigidly connected to the inner cylinder.

7. The combination in a grease gun of two cylinders, one fitting within the other; a piston within the inner cylinder; means for actuating said piston; a cover for the outer cylinder; and an outlet nozzle rigidly connected to the inner cylinder; said inner cylinder having a milled portion extending outside of the outer cylinder.

8. The combination in a grease gun of two cylinders fitting one inside of the other and having an outlet; a piston for the inner cylinder; means for actuating said piston to force material through the outlet; and a tubular gripping extension connected to the inner cylinder.

9. The combination in a grease gun of two cylinders one fitting within the other; a cover for the outer cylinder; a nozzle rigidly connected to the inner cylinder and passing through said cover; and means for forcing material from the inner cylinder out through said nozzle.

10. The combination in a grease gun of two cylinders one fitting within the other; the outer cylinder having a funnel shaped end; the inner cylinder having a nozzle connected to its head adjacent said end; a cover for the outer cylinder detachably mounted on the funnel shaped end of the outer cylinder and longitudinally movable on the nozzle; with means for forcing material from the inner cylinder out through the nozzle.

In testimony whereof, I have signed my name to this specification, in the presence of two subscribing witnesses.

SAMUEL P. TOWNSEND.

Witnesses:
WILLIAM PARROTT,
PAUL A. COLEMAN.